(12) United States Patent
Shirley et al.

(10) Patent No.: US 9,360,156 B2
(45) Date of Patent: Jun. 7, 2016

(54) EQUIPMENT MOUNT

(71) Applicants: Charles Shirley, Reno, NV (US); Relina Shirley, Reno, NV (US)

(72) Inventors: Charles Shirley, Reno, NV (US); Relina Shirley, Reno, NV (US)

(73) Assignee: HIDEit Mounts, Inc., Reno, NV (US)

( * ) Notice: Subject to any disclaimer, the term of this patent is extended or adjusted under 35 U.S.C. 154(b) by 0 days.

(21) Appl. No.: 14/205,284

(22) Filed: Mar. 11, 2014

(65) Prior Publication Data

US 2015/0264823 A1  Sep. 17, 2015

(51) Int. Cl.
*E04G 3/00* (2006.01)
*F16M 13/02* (2006.01)

(52) U.S. Cl.
CPC ..................................... *F16M 13/02* (2013.01)

(58) Field of Classification Search
USPC .............. 248/917, 918, 919, 921, 922, 285.1, 248/286.1, 287.1, 316.7, 292.1, 292.12, 248/291.1, 466, 475.1, 295.11, 297.21
See application file for complete search history.

(56) References Cited

U.S. PATENT DOCUMENTS

| | | | | |
|---|---|---|---|---|
| 5,400,993 | A * | 3/1995 | Hamilton | 248/279.1 |
| 5,603,474 | A * | 2/1997 | Weber | 248/127 |
| 7,077,373 | B1 * | 7/2006 | Hoebener et al. | 248/278.1 |
| 8,353,490 | B2 * | 1/2013 | Spinelli | 248/201 |
| 2011/0260026 | A1 * | 10/2011 | Ye et al. | 248/298.1 |

* cited by examiner

*Primary Examiner* — Steven Marsh
(74) *Attorney, Agent, or Firm* — Ian Burns; ATIP Law.com

(57) ABSTRACT

A frame having one or more wall mount angle brackets. The wall mount brackets have a plate for mounting to a wall and a horizontally projecting surface. Outer brackets connect through slotted plates to the wall brackets allowing for variation in the depth of the object supported by the frame, i.e. the distance that the object projects from the wall. The outer brackets are themselves made of two pieces that join through slotted plates allowing for variation in the height of the supported object.

20 Claims, 5 Drawing Sheets

EQUIPMENT MOUNT

FIELD OF THE INVENTION

The present invention relates to systems, devices and methods for vertically mounting or horizontally shelving equipment such as, but not limited to, set top boxes, speakers, audio players, games consoles, computers, media devices, and other such electrical equipment.

BACKGROUND

In many residential and business premises, there is often a wide variety of electrical equipment in use. In such a situation, for example, in the area of the television or digital signage, there may be many other items of electrical equipment such as game consoles, DVD players, digital or personal video recorders (DVR's/PVRs), digital media devices, wireless access points, routers, set top boxes, computers, speakers, etc. In many instances, it is not necessary for these items to be on display and these items could potentially be hidden behind the television or digital signage by mounting the item to the wall, a cabinet, ceiling, or other surface. Unfortunately, the equipment comes in wide variety of shaped and sizes and it can be difficult therefore to mount the equipment to a surface.

What is required is a system and method for vertically mounting or horizontally shelving various sized electrical equipment.

SUMMARY OF ONE EMBODIMENT OF THE INVENTION

Advantages of One or More Embodiments of the Present Invention

The various embodiments of the present invention may, but do not necessarily, achieve one or more of the following advantages:

the ability to mount equipment, such as electrical equipment and components to a wall, desk, cabinet, ceiling, under a shelf or other surface;

the ability to mount equipment of various sizes;

the ability to reconfigure an equipment mount to suit electrical equipment;

the ability to provide accommodate a large variety of equipment with a frame of components;

the ability to minimize a need for additional products such as wire/cord covers as the electrical equipment can now be closer to the television or digital display and wires can be shorter and no longer hang below the display;

the ability to minimize a need for additional cabinet to store such electrical devices that need to be connected to a television or digital display.

These and other advantages may be realized by reference to the remaining portions of the specification, claims, and abstract.

BRIEF DESCRIPTION OF ONE EMBODIMENT OF THE PRESENT INVENTION

In one aspect, the present invention provides an equipment mount comprising a frame having one or more wall mount angle brackets. The wall mount brackets may comprise a plate for mounting to a wall or vertical surface and/or a horizontally projecting surface. Outer brackets may connect through slotted plates to the wall brackets allowing for variation in the depth of the object supported by the frame, i.e. the distance that the object projects from the wall. The outer brackets may themselves be made of two pieces that join through slotted plates allowing for variation in the height of the supported object.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF CERTAIN EMBODIMENTS OF THE PRESENT INVENTION

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

Figure 1:
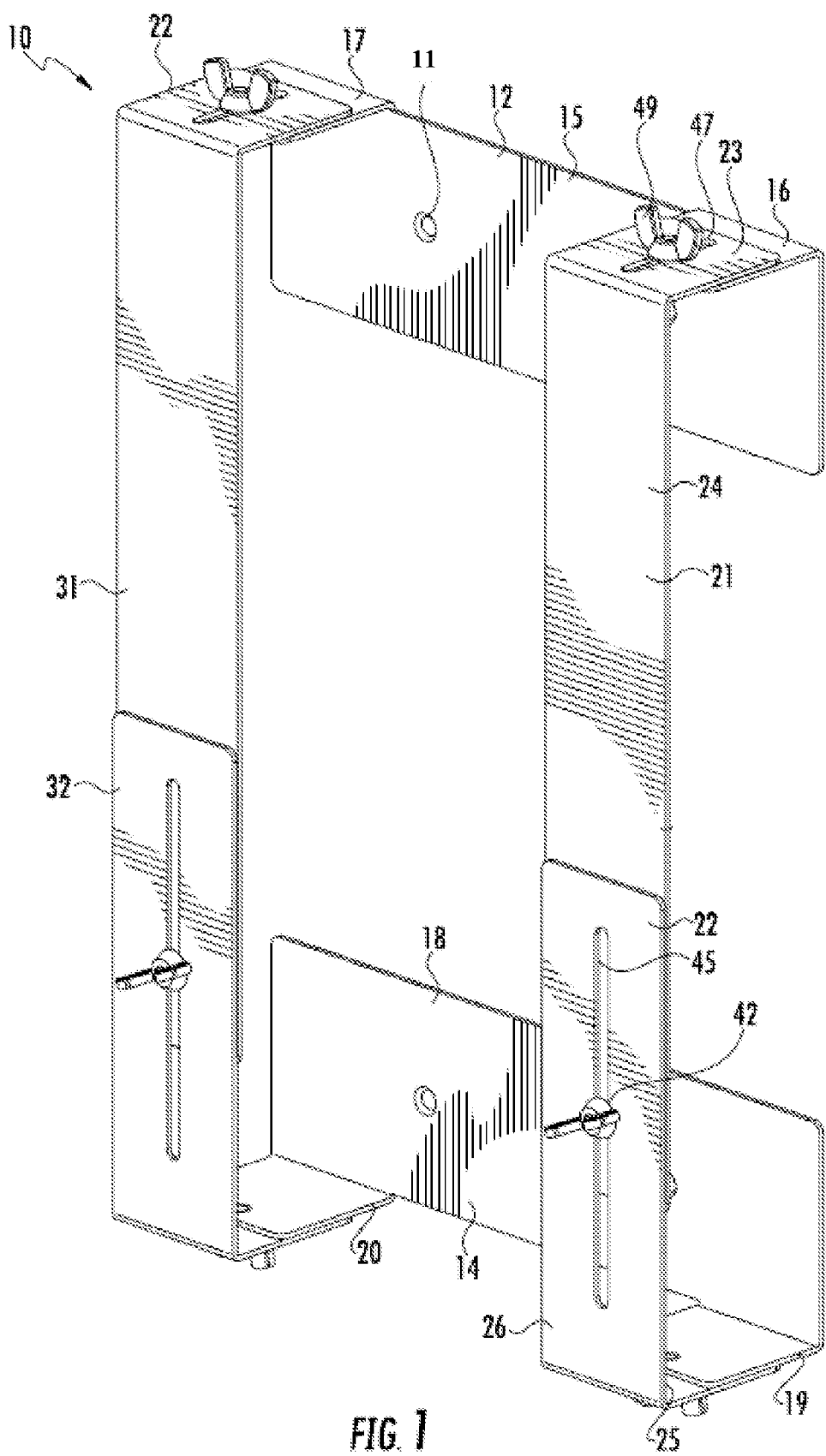
FIG. 1 substantially shows a perspective view of an equipment mount of the present invention.
Figure 2:
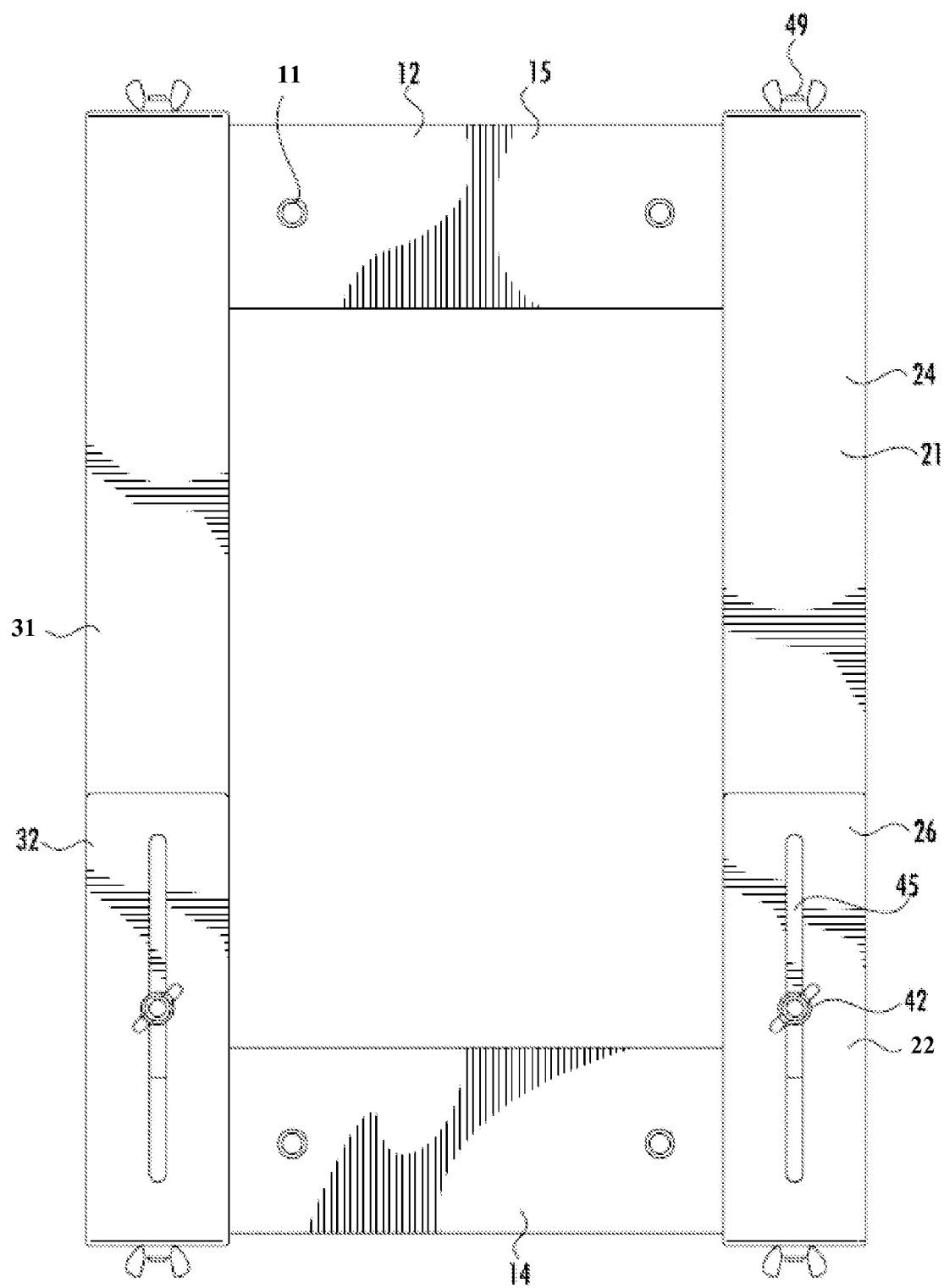
FIG. 2 substantially shows a front view of the equipment mount.
Figure 3:
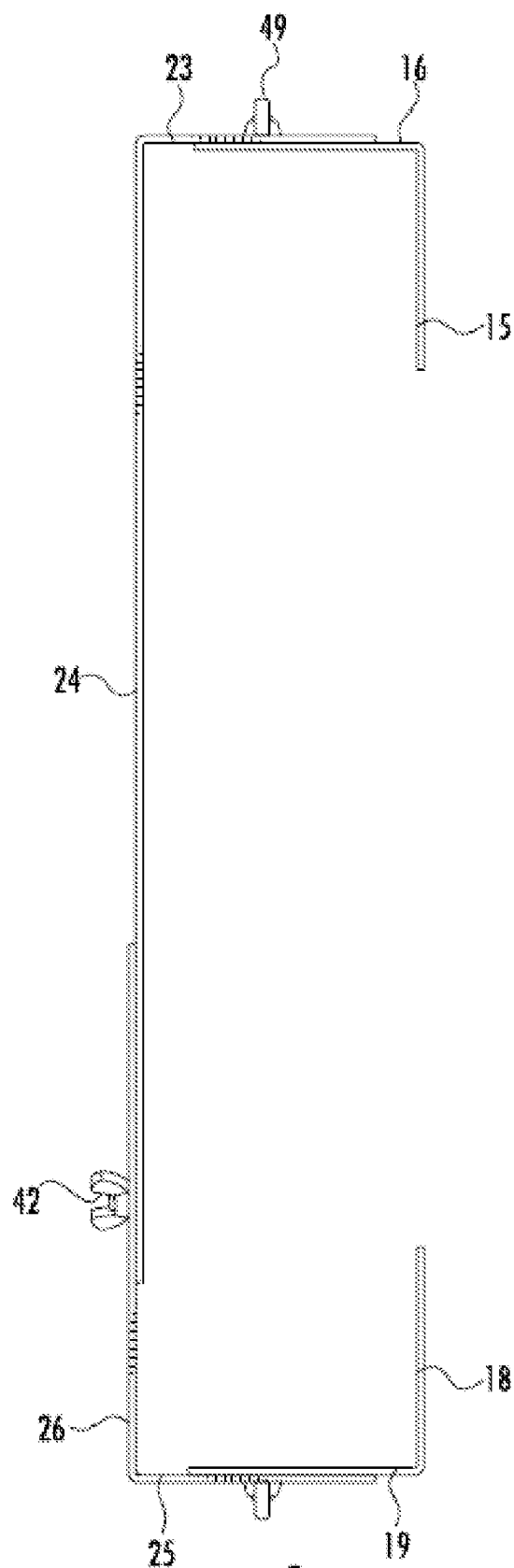
FIG. 3 substantially shows a side view of the equipment mount.

In FIG. 1, there is shown an equipment mount frame 10 in accordance with one embodiment of the present invention. The frame 10 includes an upper wall mount bracket 12 and a lower wall mount bracket 14. Each of the upper wall mount bracket 12 and lower wall mount bracket 14 may be an angle bracket. For example, the upper wall mount bracket has a vertical plate 15 that may include one or more apertures 11 that provide a means for securing the wall mount bracket 12 to a vertical wall or other supporting surface, e.g. by the use of screws, tek screws, rivets or other suitable fasteners. Extending perpendicular to the vertical plate 15 may be one or more horizontal plates 16, 17. While right 16 and left 17 horizontal plates are shown, there may be a single horizontal plate extending some or all of the distance between the left and right plates or there may be any number of discrete horizontal plates. The horizontal plates 16, 17 extend perpendicularly to the vertical plate 15 and are continuous with the vertical plate 15 through substantially right angle bends. Similarly the lower wall mount bracket 14 includes a vertical plate 18 for securing to a wall or similar surface and horizontal plates 19, 20 extending perpendicular thereto through substantially right angle bends. For ease of manufacture, the upper and lower mounting wall mount brackets are typically the same component with one rotated through 180 degrees relative to the other.

For a configuration in which the wall mounts 12, 14 have left and right horizontal plates 16, 17, 19, 20, as shown, the frame 10 may include right 21 and left 31 upper outer brackets and right 22 and left 32 lower outer brackets. The left and right outer bracket components are spaced along the width of the equipment frame. For sake of clarity and succinctness, the right upper and lower outer brackets will be described in detail. The left upper and lower outer brackets may be considered to be the equivalent. Each of the upper outer bracket 21 and the lower outer bracket 22 may comprise an angle bracket. For example, the upper outer bracket 21 may include a horizontal plate 23 and a vertical plate 24 that extends perpendicular to the horizontal plate 23 and connects to the horizontal plate 23 through a substantially right angle bend. Similarly, the lower outer bracket 22 may comprise an angle bracket including a horizontal plate 25 and a vertical plate 26 that extends perpendicular thereto.

The frame members and components are configured to accommodate a large variety of equipment sizes to be mounted. To this end, lengthening joins are provided in the horizontal and vertical plates for allowing both the height (i.e. vertical dimension) and depth (i.e. distance from the wall) of the equipment frame to be varied. In one embodiment, height adjustment is accommodated by slots 45 in the vertical plates 26 of the lower outer bracket 22. The vertical plates 24 of the upper outer brackets 21 have an aperture (not shown) that is disposed for alignment with the slot 45. For example, the slot and the aperture may each be provided on a longitudinal axis of the respective vertical plates 26, 24. The upper outer bracket 21 may be secured to the lower outer bracket 22 by a nut and bolt 42 inserted through the slot and aperture. The slot 45 allows the combined length (i.e. height) of the upper and lower outer brackets 21, 22 to be varied. While the slot is shown as placed in the vertical plate 26 of the lower outer bracket 22, the person skilled in the art will readily recognize that the slot could alternatively be placed in the vertical plate 24 of the upper outer bracket 21. Alternatively or in addition, other types of lengthening joins, such as telescopic mechanisms, will be apparent to a person skilled in the art.

In a similar manner, depth adjustment may be provided by the use of slots in the horizontal plates 23, 25 of the upper and lower outer brackets 21, 22. For example, upper outer bracket 21 has a slot 47 in the horizontal plate 23. A bolt may be inserted through an aperture (not shown) in the horizontal plate 16 of the upper wall mount 12 and through the slot 47 to be secured by a nut 49. The slot 47 allows the combined length (i.e. depth) of the vertical plate 16 of the wall mount 12 and the vertical plate 23 of the upper outer bracket 21 to be varied, thereby varying the depth of the equipment that can be accommodated in the frame 10. The lower outer bracket 22 may be secured to the lower wall mount 14 in a similar manner so that the depth of the lower bracket 22 can be varied.

It should be noted that while the lower outer bracket 22 is shown outward of the upper outer bracket 21, this arrangement may be reversed in alternative embodiments so that the upper outer bracket is disposed more outward than the lower out bracket. Similarly, the arrangement of the upper and lower outer brackets relative to the horizontal plates 16, 19 may be reversed.

Connection of the frame 10 will now be described. As described above, the wall mounting brackets may be first secured to a wall at an appropriate spacing by fasteners through the apertures 11. Next, the upper outer bracket 21 may be secured to the upper wall mount 12 and the lower outer bracket 22 may be secured to the lower wall mount 14. The upper outer bracket 21 may then be secured to the lower outer bracket 22. An item of equipment may be secured within the frame at any suitable time. When the frame has been mounted to the surface, there is a gap between the vertical plates of the wall mounts and the vertical plates of the outer brackets. The gap accommodates one or more items of electrical equipment. The outer brackets assist in retaining the equipment against the wall mounts and the wall surface. The equipment may rest on the upper surfaces of the horizontal plates of the lower outer brackets.

The person skilled in the art will readily appreciate that the order of steps of assembly need not necessarily be performed in the order that has been described. Generally, the components of the frame may be assembled in any order and the wall mounts may be secured to the wall or surface at any stage in the procedure. For example, in an alternative method, the frame may be assembled and sized around the item of equipment prior to securing the wall mounts 12, 14 to the wall. That is, the upper outer brackets and lower outer brackets may be attached to each other with the equipment in place in order to ensure the correct height is attained and to ensure that the wall mounts of the frame are placed at the appropriate locations.

Figure 4:
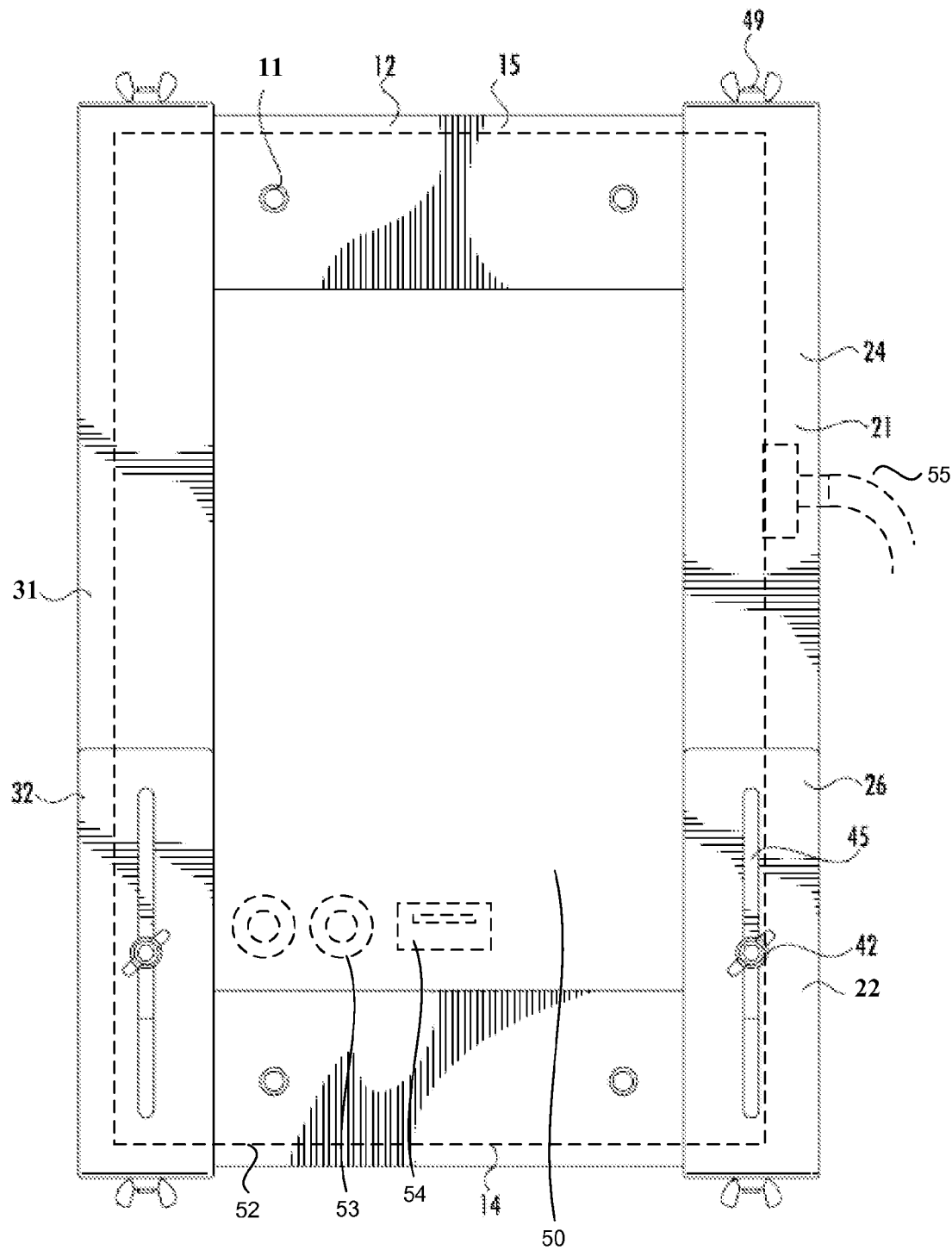
FIG. 4 substantially shows equipment supported by the equipment mount.

FIG. 4 shows an embodiment of the frame secured to a wall and supporting equipment such as a set top box or gaming console. The device 50, shown in ghosted outline, is retained in front of the upper and lower wall mounts 12, 14 which are secured to the wall. The device 50 is further retained behind the left and right upper outer brackets 31, 21 and left and right lower outer brackets 32, 22. A lower surface 52 of the device 50 may rest on an upper surface of the left and right horizontal plates 20, 19. Alternatively or in addition, the device 50 may be secured to the frame and/or wall by suitable fastening means including, without limitation, adhesives, tape, double sided tape, screws, etc.

The frame allows the device to be secured against the wall surface while still providing access to ports and connectors of the device. For example, cable connector 53 and USB connector 54 may be accessed through the front opening defined by the outer brackets 21, 22, 31, 32. Side cable 55, which may be for example a data cable or a power cable, can be connected to an equipment port through a side opening defined between the outer brackets and the wall surface. Other equipment ports that could be accessed would include ports for connections of different multi-media such as CD or DVD drives, flash drives, graphics cards, etc. Because the frame 10 has open sides on each of the front, top, bottom, left and right sides, the equipment can be disposed in the most suitable orientation to provide access to the ports of the equipment, with the frame dimensions then being adjustable to most suit the equipment orientation.

Figure 5:
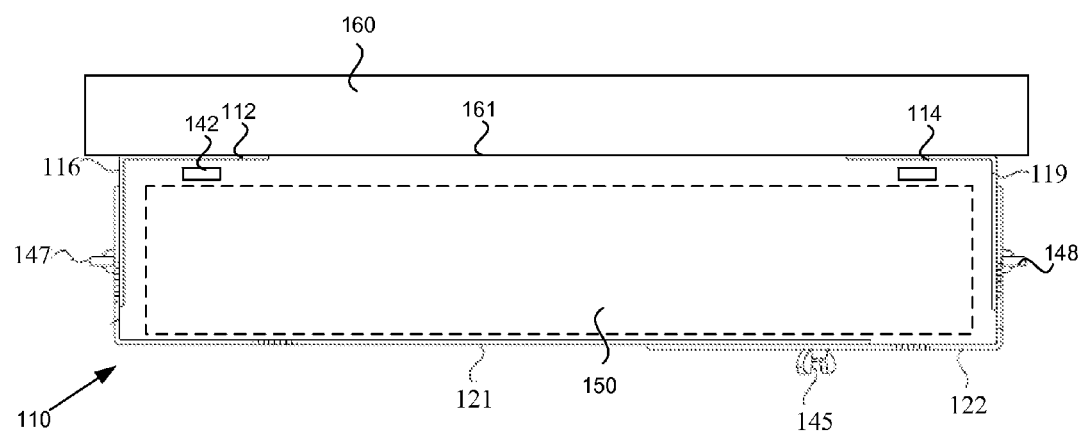
FIG. 5 substantially shows an equipment mount supporting equipment below a horizontal surface of a fixture.

FIG. 5 shows an embodiment of the frame 110 secured to the substantially horizontal underside surface of a shelf, table, ceiling or other suitable fixture 160. Cable connectors have been omitted in FIG. 5 for clarity. In this embodiment, the frame is rotated through 90 degrees relative to the previously described wall mounted embodiments so that surface mounts 112, 114 are secured to the underside surface 161 of the fixture 160 by suitable fasteners 142 such as screws, tek screws, rivets, adhesives, etc. The surface mounts 112, 114 have vertical bracket components 116, 119 that support lower support angle brackets 121, 122 through slotted engagements 147, 148 for accommodating variation in height. The lower support angle brackets 121, 122 themselves attach through a slotted engagement 145 for accommodating variation in width or length. A device or equipment 151 may be retained by the frame 110 beneath the horizontal surface 160 with the device 151 resting on the lower support angle brackets 121, 122. Additional retention may also be provided as described above.

Throughout the foregoing, directional terms such as left, right, upper, lower, front, back, vertical, horizontal etc. are used herein as an aid to describing the embodiments of the invention as they are depicted in the drawings. Such directional terms are not intended to limit the embodiments and the person skilled in the art will readily recognize that other orientations of the device are possible without departing from the spirit or scope of the invention.

While the wall mount brackets are described herein as being mounted to substantially vertical wall surfaces, the equipment mount frame may be mounted in other orientations, such as by mounting the frame to horizontal or inclined surfaces or structures. The outer brackets are depicted as being vertically mounted, but other orientations including horizontal are contemplated.

Although the description above contains many specifications, these should not be construed as limiting the scope of the invention but as merely providing illustrations of some of the embodiments of this invention. Thus, the scope of the invention should be determined by the appended claims and their legal equivalents rather than by the examples given.

What is claimed is:

1. A frame for mounting equipment to a surface, the frame comprising:
    (A) a first mount for mounting to a surface, the first mount comprising at least one first aperture that receives at least one first fastener for securing the first mount to the surface such that the first mount hangs from the surface;
    (B) a second mount for mounting to the surface, the second mount comprising at least one second aperture that receives at least one second fastener for securing the second mount to the surface such that the second mount hangs from the surface;
    (C) at least one first outer bracket;
    (D) at least one second outer bracket;
    (E) wherein the at least one first outer bracket detachably attaches to the first mount;
    (F) wherein the at least one second outer bracket detachably attaches to the second mount;
    (G) wherein the at least one first outer bracket detachably attaches to the second outer bracket;
    (H) wherein an attachment of the at least one first outer bracket to the first mount allows a combined length of the at least one first outer bracket and the first mount in a first dimension to be varied;
    (I) wherein an attachment of the at least one second outer bracket to the second mount allows a combined length of the at least one second outer bracket and the second mount in the first dimension to be varied;
    (J) wherein an attachment of the at least one first outer bracket to the at least one second outer bracket allows a combined length of the at least one first outer bracket and the at least one second outer bracket in a second dimension to be varied;
    (K) wherein in use the first mount and the second mount are mounted to the surface; and
    (L) wherein in use when the first mount and the second mount are mounted to the surface, the at least one first outer bracket and the at least one second outer bracket are outward of the first mount and the second mount with respect to the surface.

2. The frame of claim 1 wherein the first mount comprises a first mount angle bracket comprising a first plate for attaching to the surface and a second plate extending at an angle to the first plate, wherein the first plate is aligned in the second dimension and wherein the second plate extends in the first dimension from the first plate.

3. The frame of claim 2 wherein the second mount comprises a second mount angle bracket comprising a third plate for attaching to the surface and a fourth plate extending at an angle to the third plate, wherein the third plate is aligned in the second dimension and wherein the fourth plate extends in the first dimension from the third plate.

4. The frame of claim 2 wherein the at least one first outer bracket comprises a first outer bracket angle bracket comprising a fifth plate that detachably attaches to the second plate of the first mount angle bracket and a sixth plate perpendicular to the fifth plate that detachably attaches to the second outer bracket.

5. The frame of claim 4 wherein the fifth plate and the second plate have a combined length in the first dimension that can be varied.

6. The frame of claim 5 wherein at least one of the fifth plate and the second plate comprise a slot used for the detachable attachment of the fifth plate to the second plate.

7. The frame of claim 4 wherein the at least one second outer bracket comprises a second outer bracket angle bracket comprising a seventh plate that detachably attaches to the second mount and an eighth plate perpendicular to the seventh plate that detachably attaches to the sixth plate of the first outer bracket angle bracket.

8. The frame of claim 7 wherein the sixth plate and the eighth plate have a combined length in the second dimension that can be varied.

9. The frame of claim 1 comprising a gap between the first mount and second mount on one side and the at least one first outer bracket and the at least one second outer bracket on another side, the gap being sized to accommodate one or more items of equipment.

10. The frame of claim 9 wherein the at least one first outer bracket and the at least one second outer bracket retain the one or more items of equipment against the surface.

11. The frame of claim 1 comprising two first outer brackets and two second outer brackets spaced along a third dimension.

12. A frame comprising:
    (A) first mount means for mounting to a surface, the first mount means comprising first aperture means that receives at least one first fastener for securing the first mount means to the surface such that the first mount means hangs from the surface;
    (B) second mount means for mounting to the surface, the second mount means comprising second aperture means that receives at least one second fastener for securing the second mount means to the surface such that the second mount means hangs from the surface;
    (C) first outer bracket means for attaching to the first mount means;
    (D) second outer bracket means for attaching to the second mount means and to the first mount means to define a gap;
    (E) wherein the first mount means, second mount means, first outer bracket means and second outer bracket means define a gap;
    (F) wherein a size of the gap is variable in at least two dimensions; and
    (G) wherein in use, the first mount means and second mount means are mounted to the surface.

13. The frame of claim 12 wherein the first mount means comprises first angle bracket means.

14. The frame of claim 12 wherein the second mount means comprises second angle bracket means.

15. The frame of claim 12 wherein the first outer bracket means comprises third angle bracket means.

16. The frame of claim 12 wherein the second outer bracket means comprises fourth angle bracket means.

17. The frame of claim 12 wherein at least one of the first outer bracket means and the second outer bracket means comprises first attachment means for attaching the first outer bracket means to the second outer bracket means, the first attachment means comprising variable length attachment means.

18. The frame of claim 12 wherein at least one of the first outer bracket means and the first mount means comprises second attachment means for attaching the first outer bracket means to the first mount means, the second attachment means comprising second variable length attachment means.

19. The frame of claim 1 wherein the surface comprises a wall, wherein the first mount is secured to the wall by at least one first fastener and wherein the second mount is secured to the wall by at least one second fastener.

20. The frame of claim 12 wherein the surface comprises a wall, wherein the first mount means is secured to the wall by at least one first fastener means and wherein the second mount is secured to the wall by at least one second fastener means.

* * * * *